United States Patent [19]

Hafner

[11] Patent Number: 5,289,724
[45] Date of Patent: Mar. 1, 1994

[54] GRAVIMETRIC METERING APPARATUS FOR POURABLE MATERIALS

[75] Inventor: Hans W. Hafner, Aichach-Walchshofen, Fed. Rep. of Germany

[73] Assignee: Pfister GmbH, Augsburg, Fed. Rep. of Germany

[21] Appl. No.: 937,049

[22] Filed: Sep. 1, 1992

[30] Foreign Application Priority Data

Sep. 6, 1991 [DE] Fed. Rep. of Germany ....... 4129618

[51] Int. Cl.⁵ ............................................... G01F 1/00
[52] U.S. Cl. ...................................... 73/861; 73/218; 222/55; 222/77; 177/145
[58] Field of Search ................... 73/218, 861; 177/16, 177/145; 222/55, 77

[56] References Cited

U.S. PATENT DOCUMENTS

| | | | |
|---|---|---|---|
| 4,336,851 | 6/1982 | Iwako | 222/77 |
| 4,528,848 | 7/1985 | Höfner | 73/218 |
| 5,125,535 | 6/1992 | Ohlman | 222/77 |

Primary Examiner—Herbert Goldstein
Attorney, Agent, or Firm—Armstrong, Westerman, Hattori, McLeland & Naughton

[57] ABSTRACT

A gravimetric metering apparatus for pourable material comprises a rotor rotating about vertical axis. The rotor has the form of a disk divided into four sectors. In a four phase measuring process the individual sectors are cyclically charged with pourable material, weighed and discharged. Preferably, an emptied sector is weighed as well and the determined tare weight is deducted from the brutto weight.

19 Claims, 11 Drawing Sheets

GRAVIMETRIC METERING APPARATUS FOR POURABLE MATERIALS

FIELD OF THE INVENTION

The invention relates to a gravimetric metering apparatus for pourable materials using a rotating means for conveying the material through a measuring path.

BACKGROUND OF THE ART

The U.S. Pat. No. 4,528,848 discloses an apparatus for continuous gravimetric metering of pourable material which is supplied through a charge opening into pockets of a rotor arranged in a housing and rotatable about a vertical axis the material being removed from the pockets by applying pressurized air through a discharge opening arranged off-set in rotational direction of the rotor in respect of the charge opening. The housing is supported pivotally about an essentially horizontal axis and is connected to a force measuring device arranged remote to this axis. At the charge opening and the discharge opening an elastic connecting member each is provided. The horizontal axis extends through the centers of the elastic connecting members such that forces caused by twisting upon loading of the metering apparatus are of no influence.

With such a metering device a high accuracy may be achieved; however it is relatively complex. Furthermore, with pourable material having a high humidity or sticky pourable material dome formation may take place in the pockets of the rotor resulting in an insufficient throughput of pourable material and falsification of the measuring values.

SUMMARY OF THE INVENTION

Accordingly, it is an object of the present invention to provide a gravimetric metering apparatus for pourable materials having a simple design and a high measuring accuracy.

According to the invention this object is achieved by a gravimetric metering apparatus comprising base means, flat rotor means divided into at least three sectors slightly movable independent from another, driving means mounted on said base means and coupled to said rotor means for rotating thereof about an essentially vertical axis, charging means for loading pourable material onto said rotor means arranged above said rotor means on one side of said vertical axis forming a charging station for said rotor means, discharging means arranged above said rotor means at a location angularly off-set from said charging means such that a free angular space is left for removing pourable material from said rotor means and forming a disk charging station, force measuring means arranged below said rotor means for being momentarily loaded by a sector carrying pourable material placed thereon at said charging station and passing through said free angular space and evaluation means for receiving mass measurement signals from said force measuring means and indicating quantities of pourable material conveyed through said rotor means.

By designing the rotor as a measuring disk an excellent measuring accuracy may be achieved rather simply. The measuring accuracy may be increased by preferably determining the tare weight.

Further features and advantages of the apparatus according to the invention will become more apparent from the description of preferred embodiments with reference to the drawings.

BEST MODE OF CARRYING OUT THE INVENTION

Figure 1:
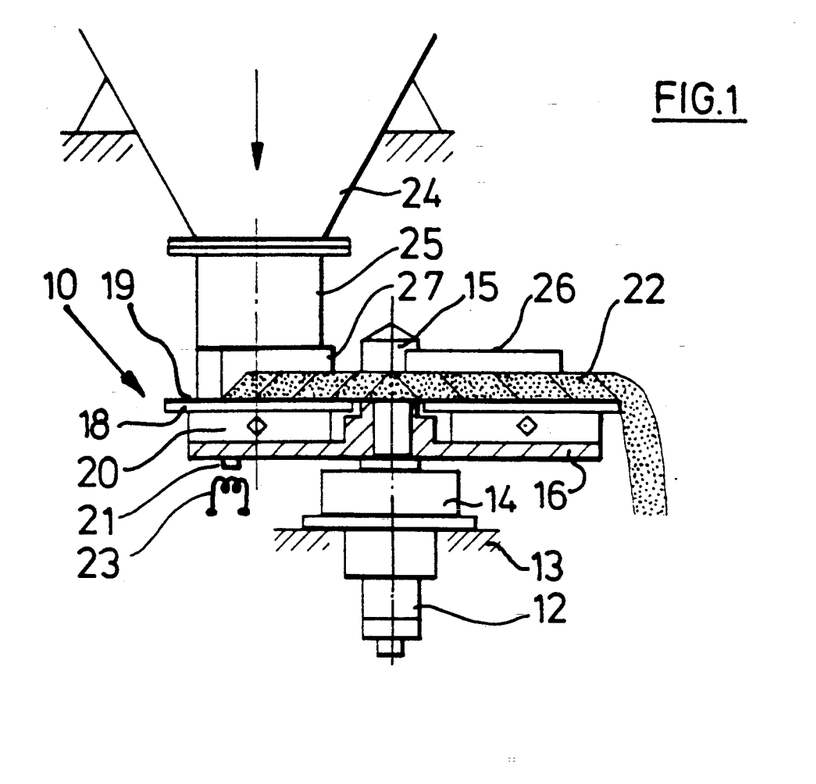
FIG. 1 is a schematic elevational view of a first embodiment of the apparatus according to the invention.
Figure 2:
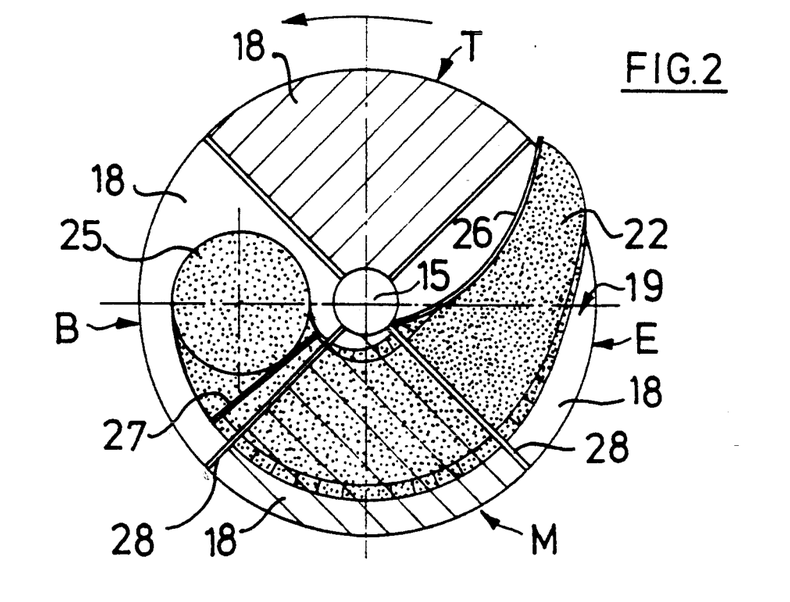
FIG. 2 is a plan view of the apparatus of FIG. 1.

FIGS. 1 and 2 illustrate a first embodiment of a sector metering apparatus 10 according to the invention including a measuring disk 19 divided, in this embodiment, in four sectors 18 and resting via force measuring devices, to be explained, in detail, later and herein referred to as load cells 20 on a rotating disk 16 driven by a motor 12 with an adjustable or controlled rotational speed, if desired, via a gearing 14 and a shaft 15. The apparatus 10 is supported by a base 13 which may be a frame or the like.

Above the measuring disk 19 at one side thereof (in FIG. 1 on the left side) there is arranged a tube 25 supplied with pourable material 22 from a stationary bin 24. Thereby, the charging station B is formed. Diametrically opposite to tube 25 a disk charging station E is stationary arranged in the form of a straight or preferably curved stripper 26 stripping off from the measuring disk 19 the material 22 placed thereon such that the measuring disk has been emptied prior to the arrival below tube 25.

The principle of the invention will be clear in particular from FIG. 2. As mentioned above, the measuring disk 19 comprises in this embodiment four equal sectors 18 which rest independent from one another, i.e., separated in a manner to be explained hereinafter by flexibly bridged radial slots 28, on load cells 20 each associated thereto such that each sector 18 may be considered a type of individual platform scale.

In the first of four phases of the metering process a sector 18 passes below the tube 25 in order to be loaded with material 22. The material 22 may be uniformed and limited in outward direction in height by means of a stationary, radially extending ledge 27.

Upon rotation of the measuring disk 19 about 90° in counterclockwise direction the sector 18 just loaded is moved into the measuring station designated by M in which it is not influenced by the further loading of the measuring disk 19, i. e. of the next sector 18 (and by the subsequent removal of material 22 from the preceding sector). At this time the load cell(s) 20 arranged below the sector 18 is (are) temporarily activated and the mass of the material 20 on the sector 18 is determined. It should be noted that this is an essentially static mass determination since sector 18 rests via the load cell(s) 20 on the rotational disk 16.

In the third phase of the mass determination process sector 18 upon a further rotation by 90° arrives in the removal region (FIG. 2, right hand side) forming the discharge station E in which the material 22 is removed from measuring disk 19 by the stripper 26. It should be noted, as shortly mentioned before, that the removal of material 22 from that sector 18 present in the removal region has no influence onto the mass determination for the following sector 18 now present in the measuring region M.

Eventually, in the fourth phase of the mass determination process the emptied sector 18 arrives in region T (top of FIG. 2) in which preferably the load cells 20 arranged below it are activated again for determining the tare weight of the empty sector 18 present there which then in turn passes into the region of tube 25 for further supply of material.

Since the tare weight of each sector — i.e. strictly speaking the mass of the sector plus residual material — is continuously determined, a complete removal of material is not required. There even may be intentionally left a certain layer below the stripper 26 such that there is no wear of the surface of the measuring disk 19.

In the above description the four phases of the mass determination process for an individual sector 18 has been explained. Of course, this process is continuous with a different sector 18 each being in the next phase each upon rotation about 90° in counterclockwise direction. More than four sectors may be provided. If the sectors are completely emptied the fourth phase may be omitted.

The momentary rotational angular position of the measuring disk 19 is continuously determined by any appropriate known means, for example, by four magnets 21 attached to the bottom side of the rotational disk 16, distributed peripherally at 90° distance each which magnets pass an induction coil 23. Thus, the instant at which the measuring disk 19 is in the position shown in FIG. 2 (and each further position rotated about 90°.) is determined. At this time the values received by the load cells 20 are determined in the measuring region M and the tare region T and the actual mass conveyed by a sector 18 is determined by forming the difference of the associated values.

If it is desired to convey a predetermined mass during discontinuous metering, this such mass is determined by accumulating or adding the determined mass values. With a continuous gravimetric metering, the determined measuring values for the individual sectors are set into relation to the time or the rotational speed of the measuring disk 19. A controlling signal for the motor 12 may be derived therefrom in order to maintain a desired value for the throughput.

The calculation may be simplified by continuously forming an average value for the tare weight at T and deducting this average value from the individual measurements in region M or, respectively, after appropriate multiplication from the overall mass.

Summing up, it can be said that during metering of pourable material by means of a relatively simple metering apparatus the mass of pourable material may be determined very exactly even if the characteristics of the material vary within a wide range. In this manner even very rough material and material having relatively bad flowing characteristics may be metered exactly.

Referring to FIGS. 1 and 2 the principle design and the principal operation of the apparatus according to the invention has been explained in detail.

Figure 3:
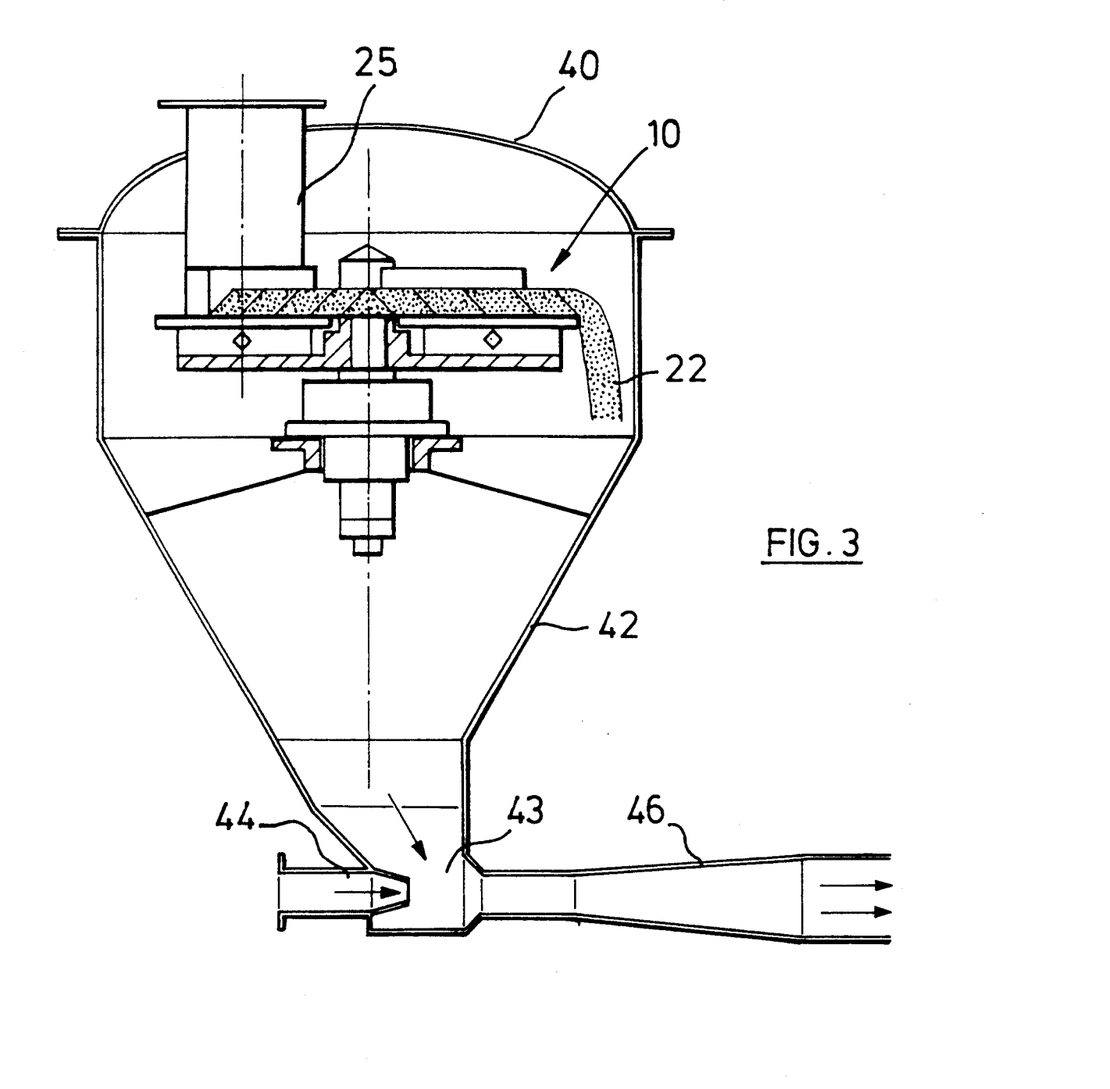
FIG. 3 illustrates the apparatus of FIG. 1 including a first modification.
Figure 4:
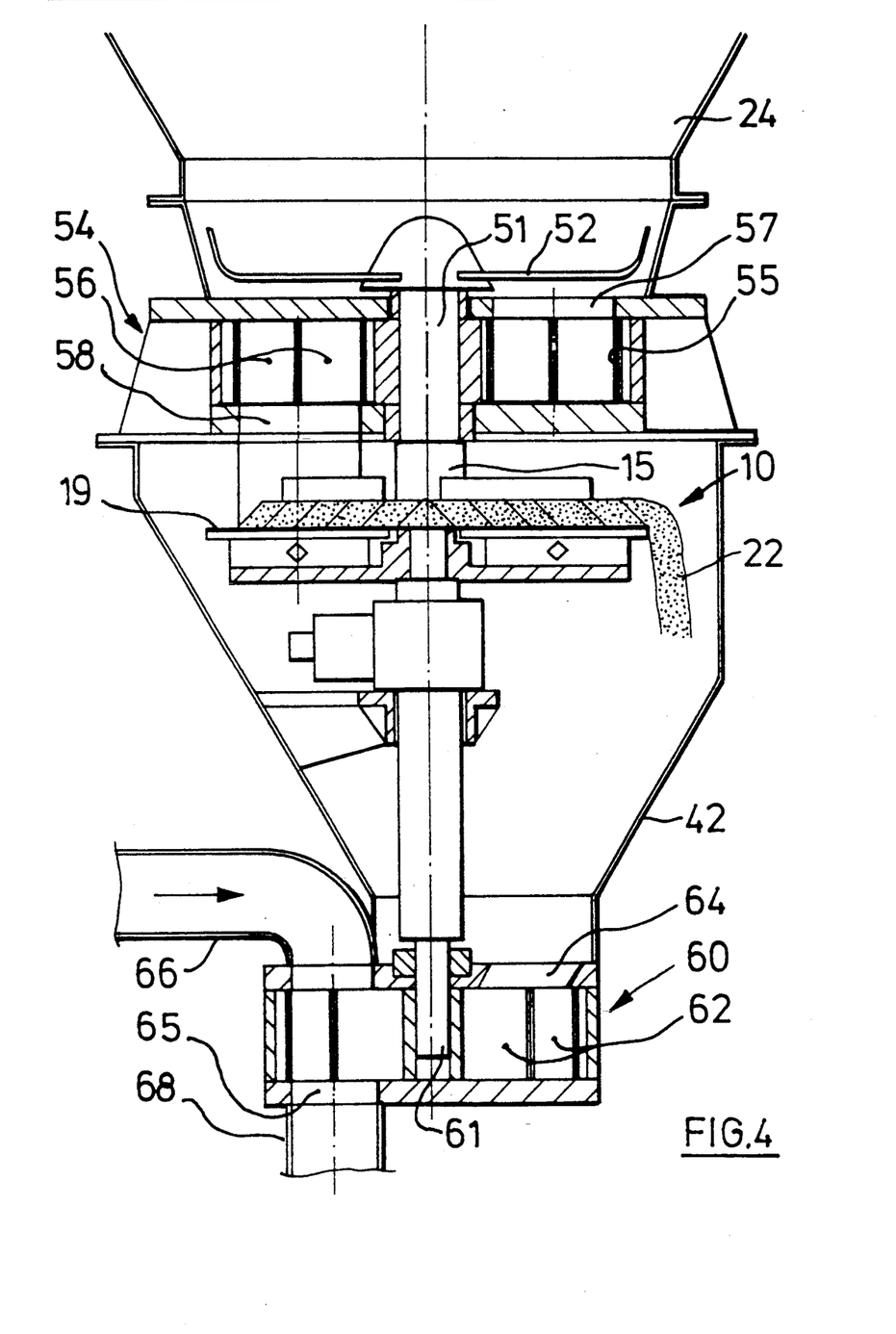
FIG. 4 illustrates the apparatus of FIG. 1 with further modifications.
Figure 5:
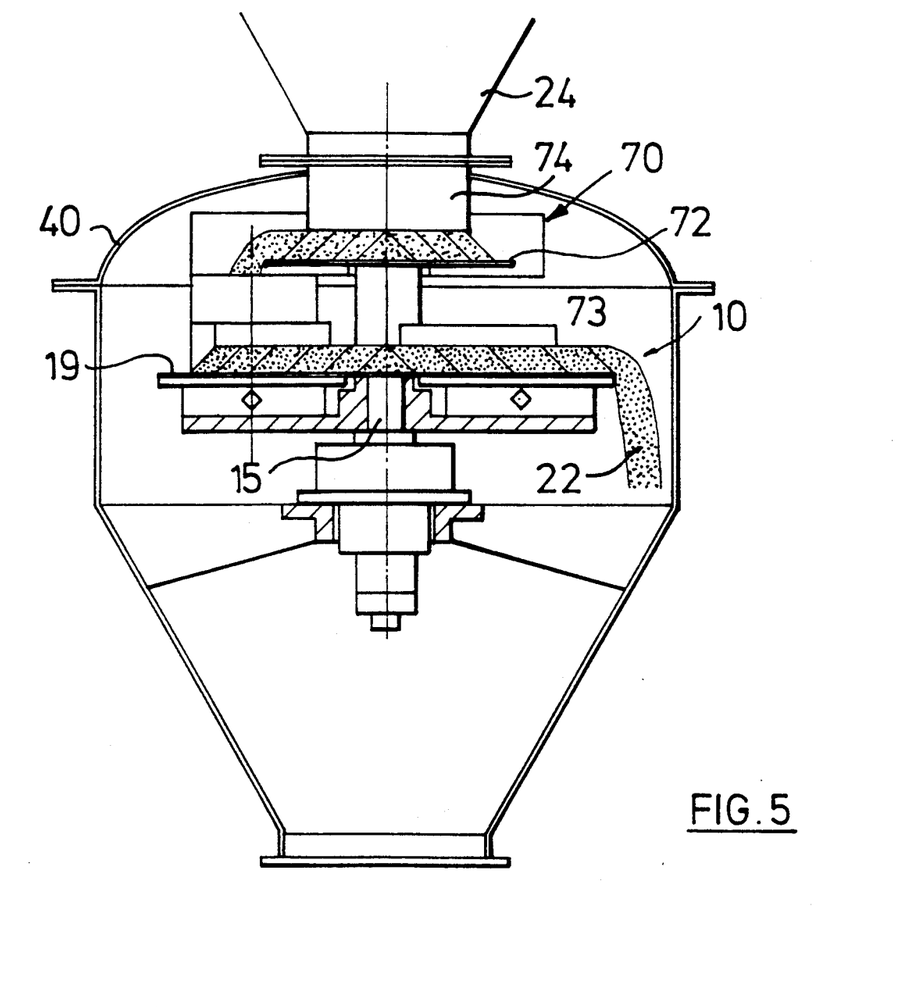
FIG. 5 illustrates the apparatus of FIG. 1 including a preferred improvement.

FIGS. 3 to 5 illustrate improvements which preferably may be used in connection with the apparatus of FIG. 1 according to the invention.

Thus, for example, FIG. 3 shows a closed system with the sector metering apparatus 10 arranged in a closed housing 40 exemplary simultaneously forming a funnel 42 through which the material 22, removed from apparatus 10, enters a narrowed chamber 43 from which it may be conveyed away pneumatically by means of pressurized air supplied through a nozzle 44 through an exit duct 46.

In FIG. 4 further modifications and improvements of the sector metering apparatus 10 according to the invention are illustrated relating on the one hand to the charging of the apparatus and, on the other hand, the conveying away of the metered material.

Thus, shaft 15 is provided with an upper extension 51 for driving a cellular wheel 55 of a cellular wheel sluice 54 with chambers 56 of the cellular wheel 55 being filled from bin 24 through an upper opening 57 in the housing of the cellular wheel sluice 54 and being emptied after rotation about a desired angular range through a discharge opening 58 at the bottom side of housing 40 onto the measuring disk 19 of the apparatus 10.

Additionally or alternatively to the cellular wheel sluice 54, a stirring device 52 may be attached to the upper end of the extension 51 of shaft 15 the rotation thereof preventing dome forming in bin 24 and uniforming material supply to the cellular wheel sluice 54 and from the latter onto the measuring disk 19.

Alternatively to the pneumatic nozzle feeding-away of the metered material, according to FIG. 3, with the apparatus of FIG. 4 again there is provided a cellular wheel sluice 60 in which the metered material 22 from funnel 42 enters the cellular wheel chambers 62 through an upper opening 64 and drops out from them through an exit opening 65 at the bottom side provided that it is not blown out by means of pressurized air supplied through a pressure duct 66 into a pneumatic feeding-away duct 68.

FIG. 5 illustrates another preferred improvement of the sector metering apparatus 10 according to the invention where, for uniforming the supply of material 22 to the measuring disk 19, there is provided a supply rotational disk 72 driven by a shaft end 73 of shaft 15. The rotational disk 72, rotating above the measuring disk 19, is again charged through a tube 74 from bin 24 such that again a uniforming of the material supply to the measuring disk 19 is achieved.

It will be appreciated that all additional devices, which may be attachable in a modular manner may be driven by a single shaft.

In FIG. 6 to 10 various alternatives are illustrated for the load cells 20 shown only schematically in the preceding figures. In principle, all force measuring devices used with common platform scales may be used, permitting a mass determination of the material 22 which may be irregularly distributed over a sector 18.

Figure 6:
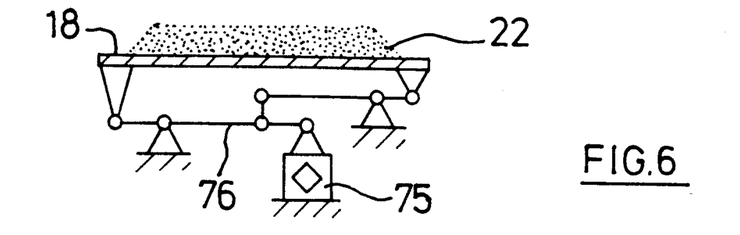
FIGS. 6 to 10 illustrate various embodiments for mass determination used with any of the apparatuses according to FIGS. 1 to 5.

Thus, FIG. 6 shows the usual lever arrangement 76 acting onto a load cell 75.

Figure 7:
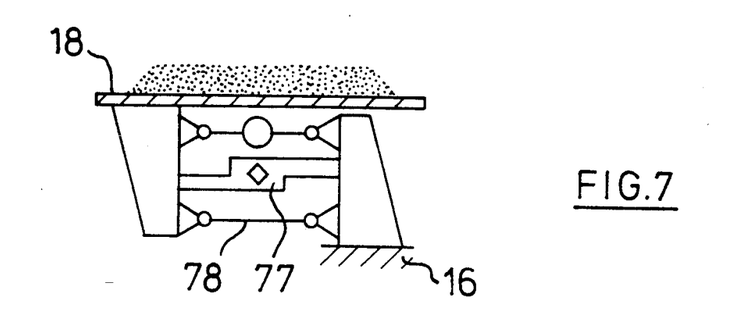
Figure 8:
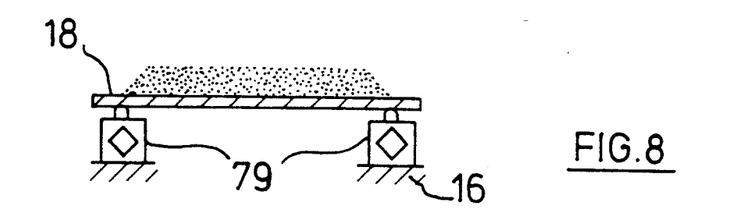

FIG. 7 shows a force measuring arrangement using a parallel lever system 78 and a shear force measuring device 77 whilst in FIG. 8 the support of sector 18 on two (or three or more) force measuring cells 79 is illustrated.

Figure 9:
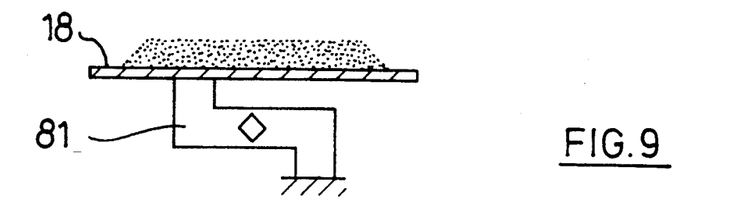

FIG. 9 shows an embodiment where the sector 18 rests on one (or several) shear force measuring cell(s) 81.

Figure 10:
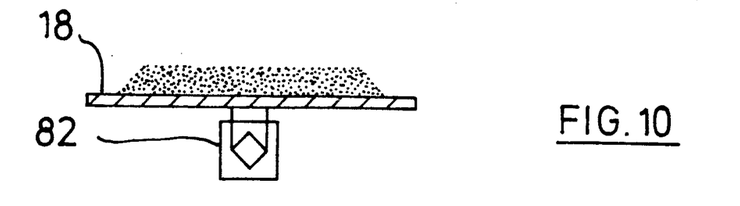

With the embodiment of FIG. 10, a single elastomeric force measuring cell 82 is used for supporting each sector 18 which cell is particularly insensitive against lateral forces (see f. i. U.S. Pat. No. 4,754,653).

With the embodiments explained above it has been assumed that the sectors 18 are mounted on the rotational disk 16 by means of corresponding load cells 20.

FIGS. 11 to 13, 15 and 16 illustrate an alternative embodiment having the load cells 20 stationarily arranged with only the measuring disk 19 rotating.

Figure 11:
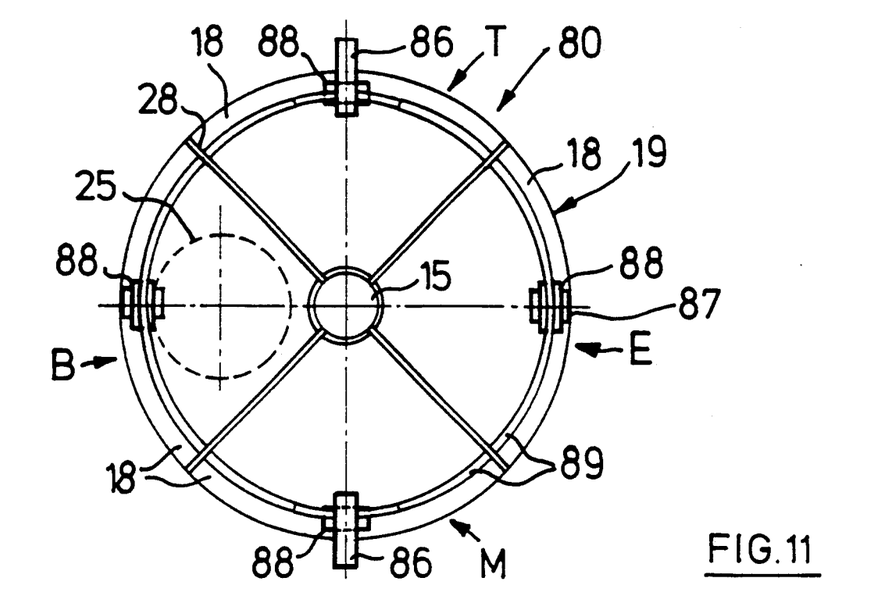
FIG. 11 is an upward view of a second embodiment of the apparatus according to the invention.
Figure 12:
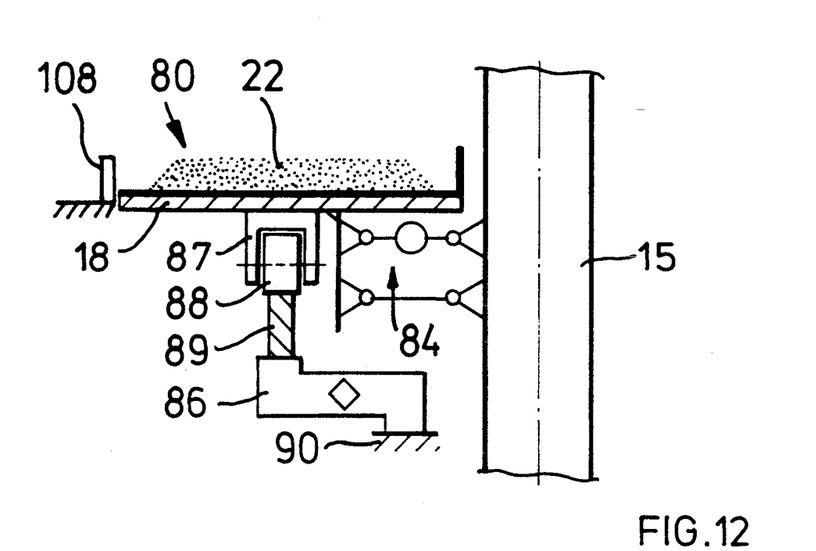
FIGS. 12 to 16 illustrate various alternatives for arranging the force measuring cells and the force introduction therefor as applied to the embodiments according to FIGS. 1 to 11.
Figure 13:
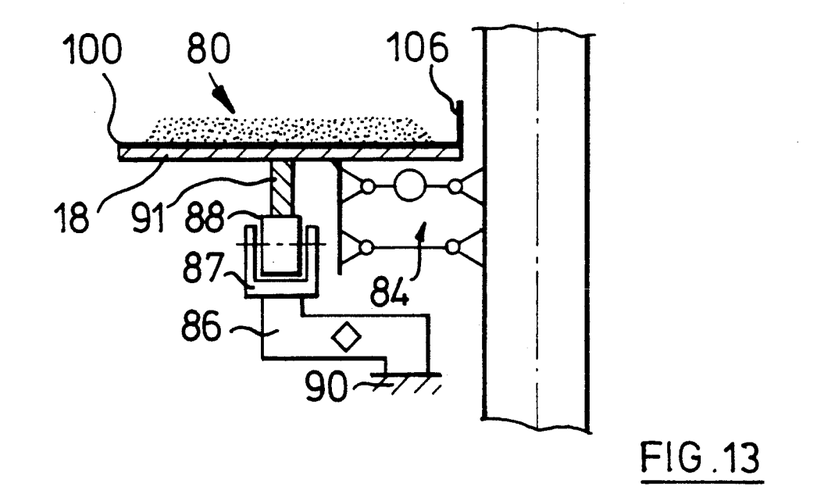

FIGS. 11 to 13 illustrate a sector metering apparatus 80 where only the measuring disk 19 is rotating and the load cells 86 are stationary arranged. For this purpose the individual sectors 18 are mounted at the shaft 15, for instance, by parallel levers 84 with one of the levers being spliced in a horizontal plane such that each sector 18 is maintained in a well known manner in horizontal alignment but is freely movable in vertical direction.

As shown only schematically in FIG. 11 and may be understood, more clearly from FIG. 12 more clearly, a rotational roll 88 is attached with a peripheral alignment to the bottom side of each sector 18 in a mount 87, which rolls are guided in a circular rail interrupted by track segments 89 in the measuring regions M and T which segments rest on any desired force measuring device, as a shear force device 86 stationary arranged on a frame 90. In the other two regions B and E the track is stationary supported on frame 90. The track segments 89 are preferably shorter than a sector 18.

As a modification of the embodiment of FIG. 12, according to FIG. 13 the rotational roll 88 may be attached to the force measuring device 86 as well with circular track segments 91 corresponding to the sector length are provided at the bottom side of the sectors 18 in corresponding opposition to the rolls 88.

Accordingly, with the shaft 15 rotating the individual sectors 18 act one after the other during passing the measuring regions M and T onto the force measuring devices 86 provided there according to the mass of the sector 18 and the material conveyed thereon, in the T region only the mass of the emptied sector 18 being determined as with the first embodiment.

According to FIG. 11, for each sector 18 only one rotational roll 88 is provided. A more uniform support may be achieved by providing more, for example two rolls peripherally per sector 18.

With the embodiments of FIGS. 12 and 13, the rotational rolls and the tracks, respectively, are arranged essentially centrally at the bottom side of sectors 18.

Figure 14:
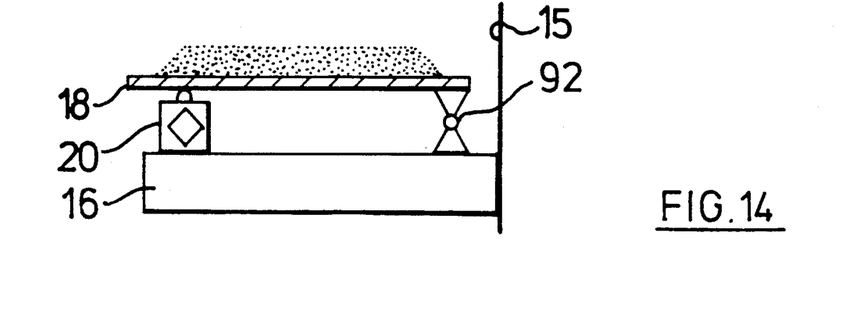
Figure 15:
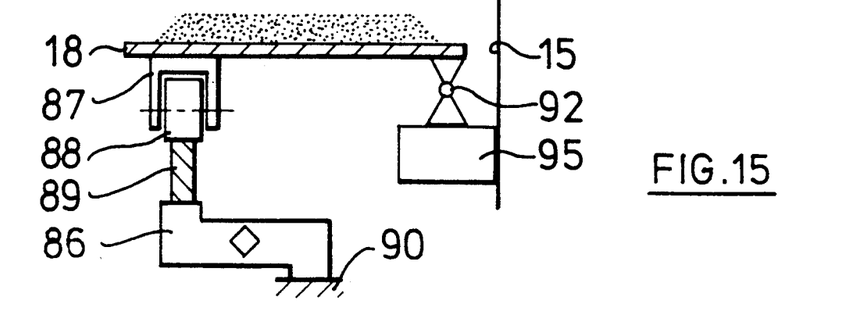
Figure 16:
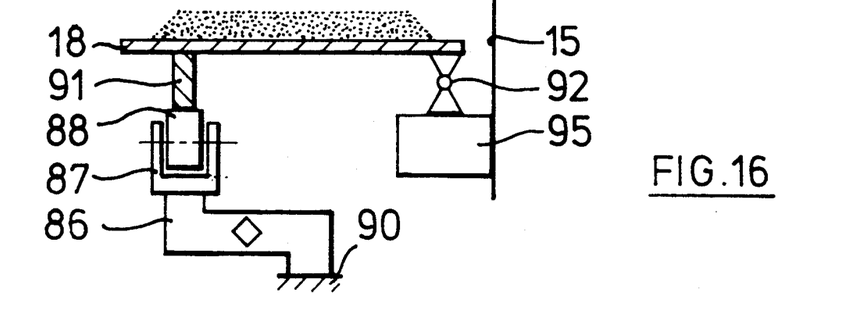

As FIGS. 11 and FIGS. 15 and 16 illustrate, a support may be provided close to the exterior rim if for example the sector 18 is supported close to its inner rim via a pivotal point 92 on a plate 95 secured to shaft 15. In this connection, it should be noted that such a linkage type support according to FIG. 14 may be used as well in connection with the first embodiment with each sector 18 resting on a load cell 20 which is mounted close to the exterior rim of the rotational disk 16.

It should further be noted that, with the embodiments of FIGS. 13 and 16, the track 89 may be omitted such that the rotational rolls 88 directly roll on the bottom surface of the sectors 18.

Figure 17:
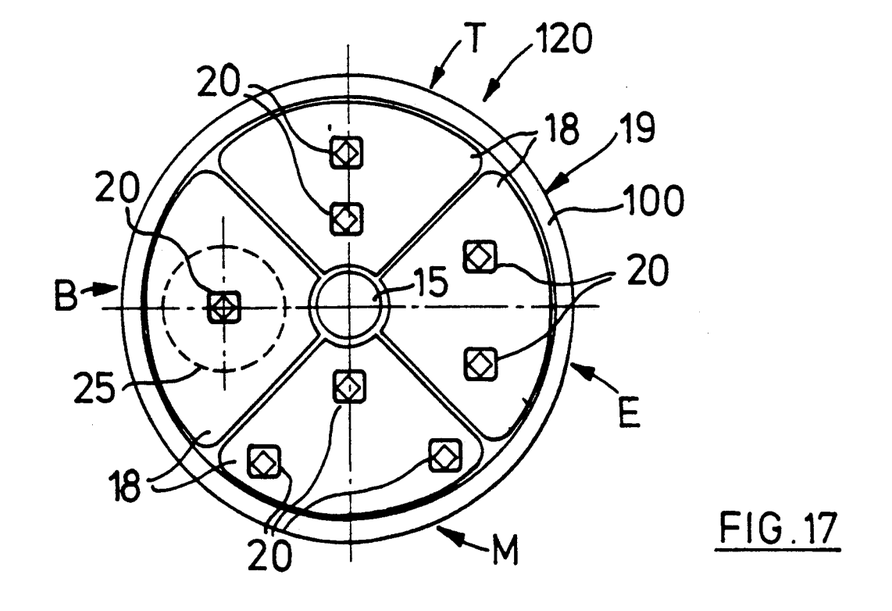
FIG. 17 is a schematic upward view of a third embodiment of the apparatus according to the invention.
Figure 18:
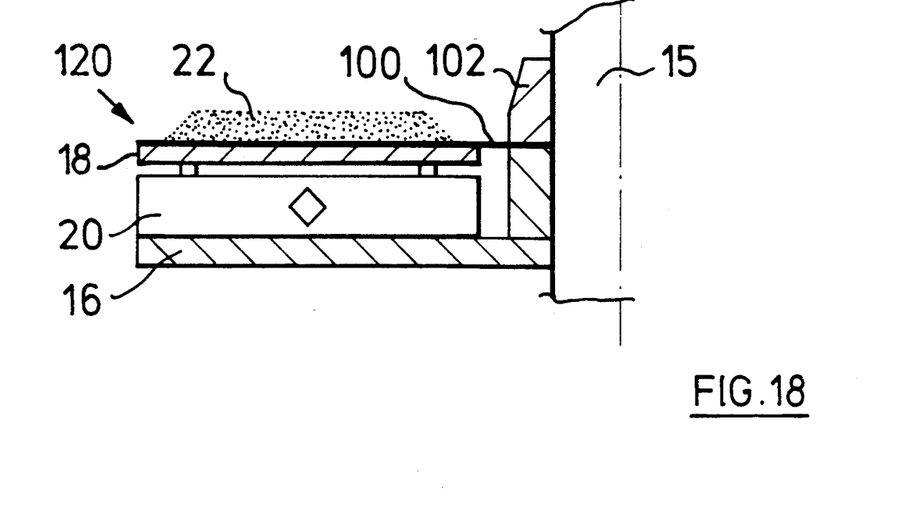
FIGS. 18 and 19 illustrate schematic vertical sections of the embodiment of FIG. 17.
Figure 19:
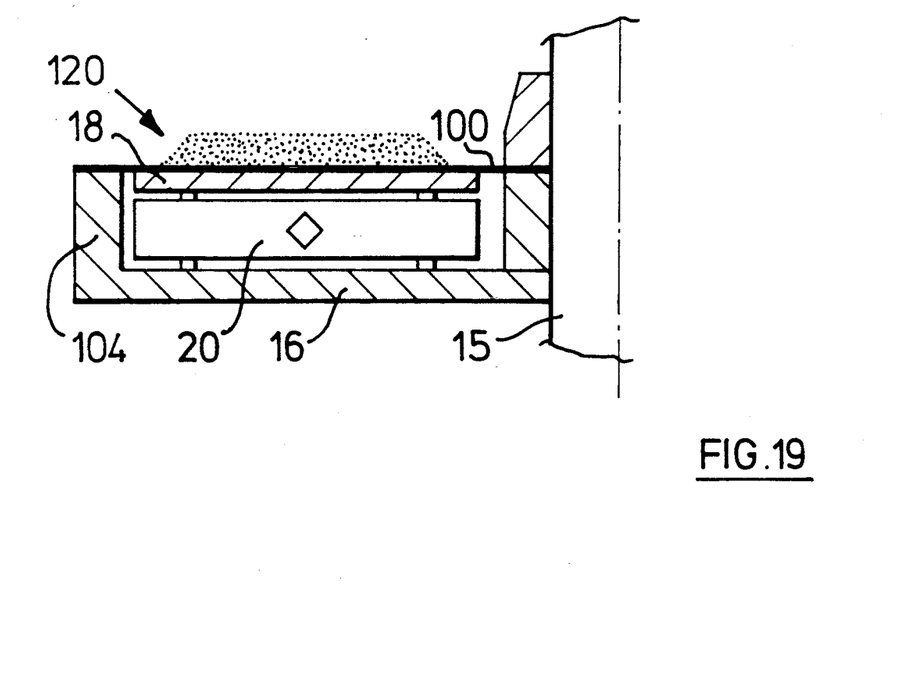

FIGS. 17 to 19 illustrate a third principal embodiment of a sector metering apparatus 120 with a rubber sheet 100 or a correspondingly thin steel sheet being applied to the top side of the measuring disk 19, covering continuously all sectors 18. The inner edge of the sheet 100 is clamped in a block 102 attached to the periphery of shaft 15. This results in an extremely simple radial fixing of the sectors 18 without essentially influencing the vertical movability. The sectors 18 may then be placed onto the force measuring device 20, for instance onto one or several measuring cells distributed about the sectors 18 without any specific measures. FIG. 17 illustrates various alternatives of such arrangements in the individual sectors the similar arrangement conveniently being used for all sectors.

As may be gathered from FIG. 19, the rotational disk 16 may be provided with a raised exterior rim 104 and the sheet 100 may extend over this rim and may be secured to the top end surface thereof.

As shown in FIGS. 12 and 13, a sheet 100 covering the sectors 18 may be provided with an annular portion raised at the interior edge thereof.

As indicated in FIG. 12, there is a further opportunity to prevent dropping off of material to be metered prior to the discharge region by stationarily arranging a wall segment 108 in the charging and the measuring regions B, M close to the exterior periphery of the measuring disk 19.

Figure 20:
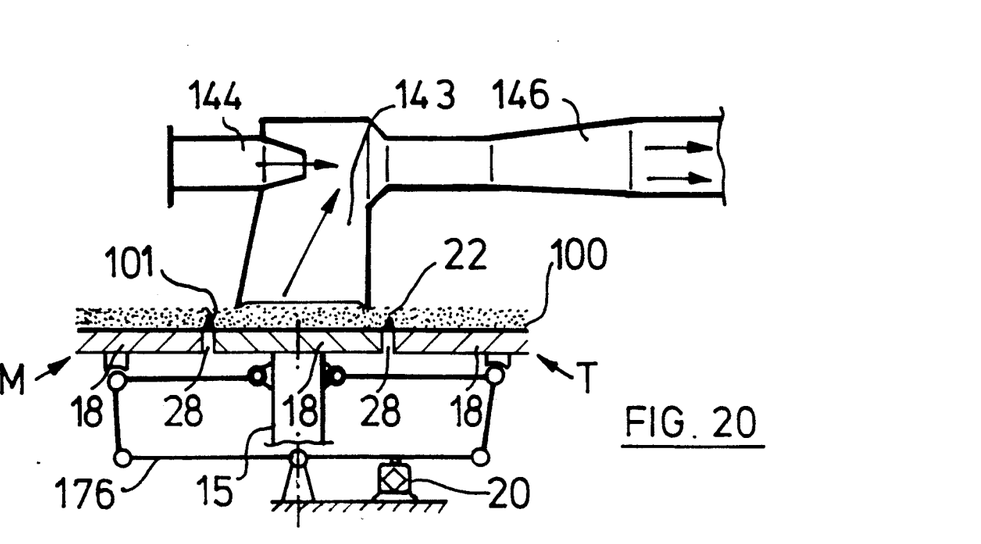
FIG. 20 illustrates modifications of the discharge and mass determination.
Figure 21:
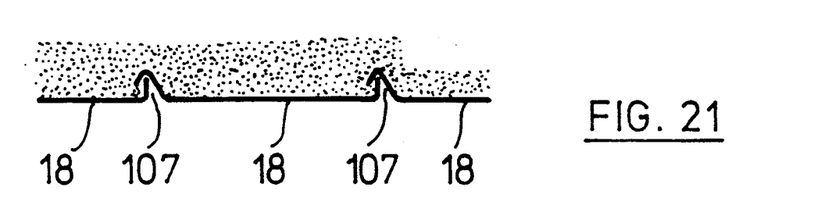
FIGS. 21 and 22 show details of the design of the transitions between the individual metering sectors.
Figure 22:
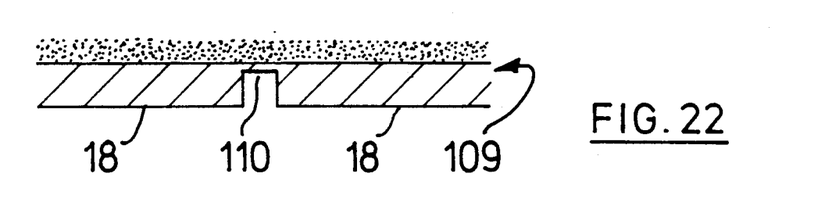

FIGS. 20 to 22 illustrate the transition between individual sectors 18.

Thus, FIG. 20 shows a continuous rubber sheet 100 covering the slots 28 between the individual sectors. In case that a steel sheet is placed onto the sectors 18 or the latter consists of such a steel plate the radial edges of the sectors 18 may be flexibly connected such that penetration of material into the slots 28 are prevented but that on the other hand a vertical movability of the sectors 18 independent from one another is maintained. For example, FIG. 21 shows such a hook-in connection 107.

In a further modification, according to FIG. 22, the measuring disk 19 comprises a steel plate 109 the thickness of which is reduced at the transitions between the individual sectors 18 by incisions such that only thin flexible bridges 110 are retained. In this connection it should be noted that the measuring cells used in connection with the invention have extremely small measuring displacements such that the bridges 110 do practically not influence the measurement at all.

FIG. 20 shows two further preferred modifications of the apparatus according to the invention: instead of using the stripper 26 the material may be sucted off from the passing sector 18 at the discharge station. Through a nozzle 144, pressurized air is supplied into a suction space 143 and the sucted-in material is fed away through a feed-away duct 146 resulting in a practically complete emptying of the sector 18 such that the tare measurement may be omitted. With such a design the individual sectors 18 may be provided with a peripheral segment wall. The radial transitions between the sectors may be formed raised with overlappings 101. The sucting-off device may be used in addition to the stripper 26 therebehind. On the other hand FIG. 20 shows a simplified alternative of mechanically forming the difference by means of a double lever linkage 176 with the momentary mass in sector T and that in sector M acting at opposite points onto the linkage 176 the difference (i. e. netto) being determined by the force measuring cell 20.

As regards the electronic control and evaluation used with the apparatus of the invention reference is made to the already mentioned U.S. Pat. No. 4,528,848. The principle disclosed there is applicable as well for the metering apparatus of the invention with the provision that some simple timing measures are included for the sequential, intermittent activating of the force measuring devices 20 (FIG. 1) during passage through the measuring station M and the tare station T in order to provide for deducting the tare value measured for a sector 18 when passing the tare station T from the brutto measuring value determined before for the corresponding sector 18 at the measuring station M.

Just as an example, the design and the function of such a control means is explained below referring to FIGS. 23 and 24.

Figure 23:
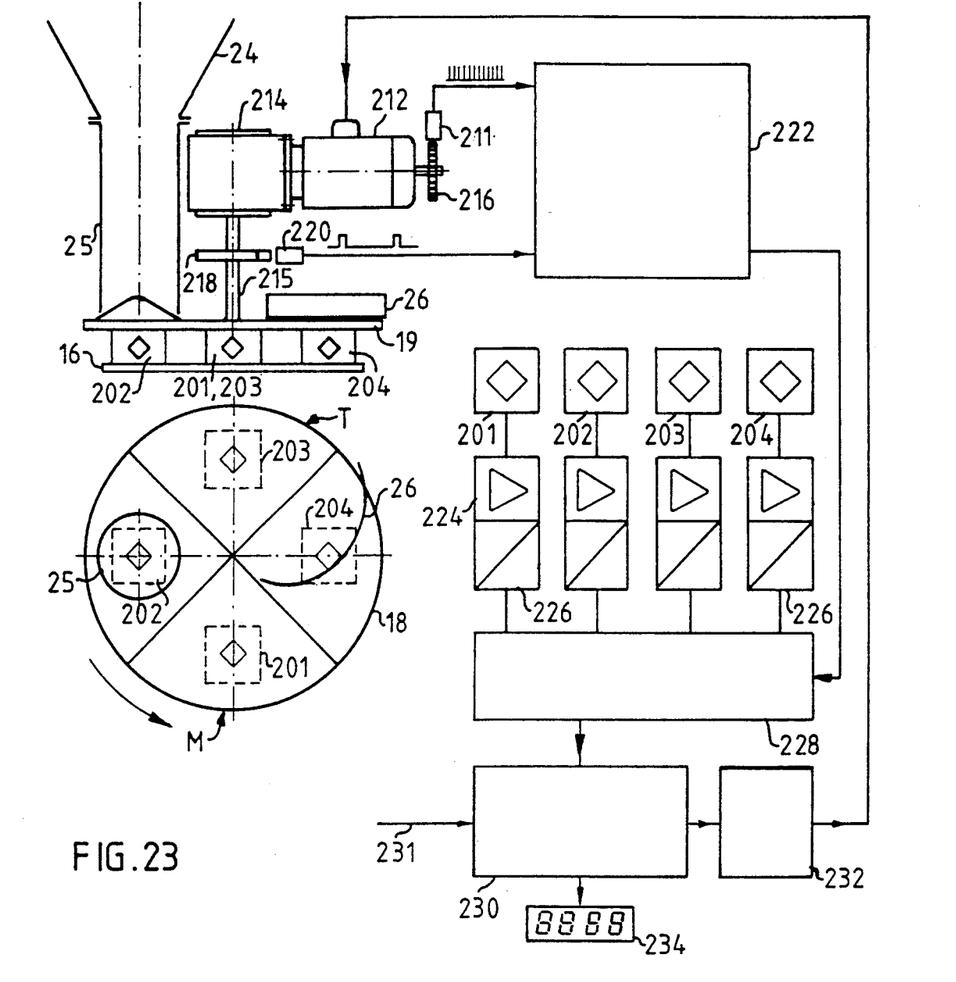
FIG. 23 shows a scheme of the control and evaluation circuitry used in connection with the metering apparatus of the invention.
Figure 24:
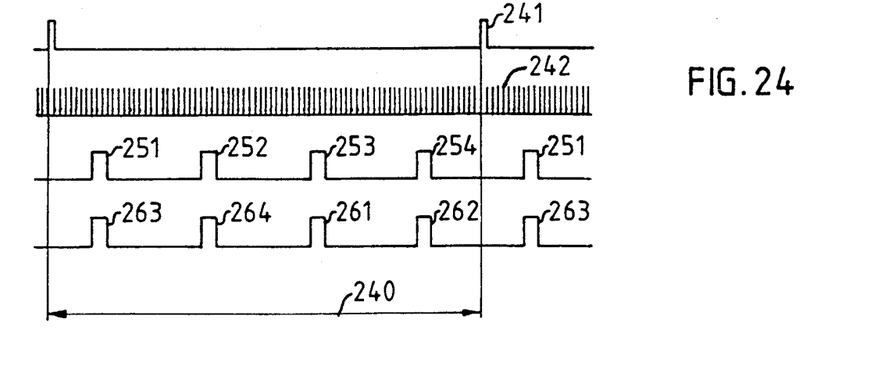
FIG. 24 is a pulse diagram for illustrating the operation of the circuitry of FIG. 23.

FIG. 23, at the left, schematically illustrates the mechanical design of the metering apparatus of the invention similar as in FIGS. 1 and 2 with the modification of the first embodiment having the rotational disk 16 driven by an upward extending shaft 215 from a motor 212 via a gearing 214. The four sectors 18 are supported through load cells 201, 202, 203 and 204, respectively on rotational disk 16.

FIG. 23, right, illustrates the electronic circuitry for the load cells 201 to 204 whose outputs are correspondingly connected to analog/digital converters 226 through amplifiers 224. The outputs of the analog/digital converters 226 are connected through a selection circuit 228 of the type of a multiplexer to an evaluation circuit 230 corresponding, in principle, the circuitry disclosed in the above mentioned U.S. Pat. No. 4,528,848.

Since the load cells 20 (FIG. 1) and 201 to 204 (FIG. 23), respectively, rotate with the rotating disk 16, the signals may be derived from the load cells in a manner well known to a skilled person inductively or through a collector ring sector/brush combination mounted on shaft 215. With the second embodiment of the metering apparatus of the invention according to FIGS. 11 to 17 the load cells 20 are arranged stationary such that an immediate electrical wire connection may be used.

With the circuitry illustrated in FIG. 23 the timing is accomplished, on the one hand, by means of a clock disk 218 secured to shaft 215 and provided with one tooth generating a pulse 241 per one rotation 240 (FIG. 24) in a sensor 220 when passing the latter which pulse is supplied to a timing circuit 222.

A gear 216 is secured to the shaft of the motor 212 with a further sensor 211 arranged in peripheral opposition with the number of teeth being such that for one rotation of shaft 215, for example, 1000 pulses 242 (FIG. 24) are generated.

Based on the pulses 241 and 242 the timing circuit 222 applies pulses 251 to 254 to the selection circuit 228 permitting passage of the output signals of the corresponding load cells 201 to 204 at an instant at which the corresponding sector 18 is passing the measuring station M (see also FIG. 2). Pulses 263, 264, 261, 262 similar to the selecting pulses 251 to 254 sequentially activate with a delay of 180° rotation that one of the load cells 201 to 204 just present at the tare station T.

In the evaluation circuit 230, the tare value measured at the tare station T is continuously deducted from the brutto value measured before for the corresponding sector 18 at the measuring station M. The resulting net value, i. e. the mass of the material conveyed by the corresponding sector, may be used for further evaluation as disclosed in detail in the above mentioned U.S. Pat. No. 4,528,848. In particular, a desired value for the material through-put may be entered via terminal 231, the current actual value may be indicated on display 234 and via a control circuit 232 the rotational speed of motor 212 may be adjusted dependent on the difference between the actual value and the desired value.

Using a plurality of pulses 242 allows a multiple measurement for each sector and each position. Instead of a single pulse 241 per rotation four pulses may be generated by providing corresponding teeth at the periphery of gear 218.

Finally, it should be noted that the various modifications of the individual embodiments may be used to a large part for the other embodiments as far as it is considered appropriate by a skilled person. This is in particular true for the charging and discharging as explained in detail in connection with the first embodiment.

I claim:

1. A gravimetric metering apparatus for pourable materials comprising:
   base means;
   flat rotor means divided into at least three sectors slightly movable independent from one another in a vertical direction;
   driving means mounted on said base means and coupled to said rotor means for rotating thereof about an essentially vertical axis;
   charging means for loading pourable material onto said rotor means arranged above said rotor means on one side of said vertical axis forming a charging station for said rotor means;
   discharging means arranged above said rotor means at a location angularly off-set from said charging means such that a free angular space is left, for removing pourable material from said rotor means and forming a discharging station;
   force measuring means arranged below said rotor means for being momentarily loaded by a sector carrying pourable material placed thereon at said charging station when passing through said free angular space forming a measuring region; and
   evaluation means for receiving mass measurement signals from said force measuring means and indicating quantities of pourable material conveyed through said rotor means.

2. The apparatus of claim 1 wherein said flat rotor means is divided into at least four sectors and further comprising a tare measuring region in which said force measuring means are activated for measuring the tare weight of a sector upon having passed said discharge station.

3. The apparatus of claim 1 wherein said discharing means is a stripper means arranged closely above said rotor means for stripping off at least a major portion of said pourable material therefrom at said discharging station.

4. The apparatus of claim 1 wherein said discharging means is a suction means for sucking off pourable material from said rotor means at said discharging station.

5. The apparatus of claim 1 wherein said rotor means comprise a disk rotationally driven by said driving means each of said sectors being supported on said disk via at least one of said force measuring means, said force measuring means associated to one sector being active during said sector passing said free angular space between said charge station and said discharging station.

6. The apparatus of claim 2 wherein said rotor means comprises a disk rotationally driven by said driving means, said each of said sectors being supported on side disk via at least one of said force measuring means, said force measuring means associated to one sector being active during said sector passing said free angular space between said charge station and said discharging station for being momentarily loaded by said one sector carrying pourable material at said discharge station.

7. The apparatus of claim 5, wherein each of said sectors form a type of platform scale with said force measuring means associated thereto.

8. The apparatus of claim 1 wherein said force measuring means are stationary mounted on said base means in the region of said free angular space for being loaded by a sector passing said space.

9. The apparatus of claim 8, wherein roll means are arranged between said force measuring means and said bottom side of said sectors.

10. The apparatus of claim 1, further comprising uniforming means arranged at said charge station for uniforming charging of said pourable material to said rotor means.

11. The apparatus of claim 10, wherein said uniforming means comprises a rotational disk distribution means.

12. The apparatus of claim 1, further comprising pneumatic means arranged at said discharging station for enhancing the feeding-away of metered pourable material from said rotor means.

13. The apparatus of claim 1, further comprising angular position detecting means connected to said evaluation means for determining the momentary angular position of said rotating means.

14. The apparatus of claim 13, wherein said evaluation means comprises means for activating said force measuring means dependent on a signal received from said angular position detecting means indicative for a sector passing said free angular space.

15. The apparatus of claim 13, wherein said evaluation means comprises means for activating said force measuring means dependent on a signal received from said angular position detecting means indicative for a sector passing said free angular space and having passed said discharging station.

16. The apparatus of claim 2, wherein said evaluation means comprises averaging means for forming an average value of tare weight values and difference forming means for deducting said average value of tare weight from mass values determined by said force measuring means and corresponding to a mass consisting of a sector plus pourable material placed thereon.

17. The apparatus of claim 1, wherein said evaluation means comprises accumulating means for accumulating masses determined by said force measuring means over a predetermined period.

18. The apparatus of claim 1, wherein said evaluation means comprises control means for continuously determining a throughput of pourable material per time period and for controlling a rotational speed of said rotating means.

19. The apparatus according to claim 1, further comprising a housing enclosing the apparatus.

* * * * *